United States Patent [19]
Imai

[11] Patent Number: 5,577,683
[45] Date of Patent: Nov. 26, 1996

[54] WEBBING TAKE-UP APPARATUS

[75] Inventor: Keisuke Imai, Aichi-ken, Japan

[73] Assignee: Kabushiki Kaisha Tokai-Rika-Denki-Seisakusho, Aichi-ken, Japan

[21] Appl. No.: 535,832

[22] Filed: Sep. 28, 1995

[30] Foreign Application Priority Data

Nov. 7, 1994 [JP] Japan ................................. 6-272695

[51] Int. Cl.$^6$ .......................... B60R 22/34; B65H 75/48
[52] U.S. Cl. ........................................................ 242/383.2
[58] Field of Search ............................... 242/383, 383.2, 242/383.4, 384, 384.6; 280/806, 807

[56] References Cited

U.S. PATENT DOCUMENTS

| | | |
|---|---|---|
| 4,417,702 | 11/1983 | Fohl. |
| 4,802,634 | 2/1989 | Singer .................................. 242/384 |
| 4,907,820 | 3/1990 | Fohl ..................................... 280/806 |
| 5,277,377 | 1/1994 | Fujimura et al. .................... 242/383.2 |
| 5,314,137 | 5/1994 | Fujimura et al. . |

FOREIGN PATENT DOCUMENTS

| | | |
|---|---|---|
| 2754155 | 5/1979 | Germany. |
| 3940374 | 6/1991 | Germany. |
| 59-21624 | 5/1984 | Japan. |
| 520957 | 3/1993 | Japan. |

Primary Examiner—John P. Darling
Attorney, Agent, or Firm—Sixbey Friedman Leedom & Ferguson; Thomas W. Cole

[57] ABSTRACT

A webbing take-up apparatus is obtained in which the timing of engaging a pair of lock plates with both side walls of a frame can be accurately controlled, thereby realizing reliable operation, and which can be manufactured at reduced costs. In the webbing take-up apparatus, a cam, which axially penetrates a take-up shaft, is integrally connected to a lock wheel. The lock timings of the lock plates disposed at both ends of the take-up shaft are controlled by the lock wheel and the cam, respectively, so that the lock plates mesh with ratchet openings formed in the side walls. With this operation, the rotation of the take-up shaft is prevented.

20 Claims, 6 Drawing Sheets

WEBBING TAKE-UP APPARATUS

BACKGROUND OF THE INVENTION

1. Field of the Invention

The present invention relates to a webbing take-up apparatus for taking up a webbing which is provided in a vehicle or the like to restrain a vehicle occupant.

2. Description of the Related Art

In a webbing take-up apparatus used in an automobile or the like, a lock mechanism is provided to prevent a webbing from being pulled out when the automobile or the like decelerates abruptly, thereby securely restraining (or holding) a vehicle occupant.

In such a lock mechanism, when an abrupt deceleration is detected by an acceleration sensor, locking means is activated in response thereto to be engaged with inwardly extending ratchet teeth formed in one of the side walls of a frame, thereby preventing a webbing take-up shaft from rotating in a webbing pull-out direction.

In the above-described webbing take-up apparatus, when the webbing is pulled out by the body of a vehicle occupant due to the inertia during an abrupt deceleration, the pulling force acting on the webbing is transmitted to the frame in which the ratchet teeth are formed. Accordingly, it is required to increase the strength of the frame of the webbing take-up apparatus by increasing the thickness of the frame or making the frame of a special material.

To overcome this problem, there have been proposed improved webbing take-up apparatuses, such as one disclosed in Japanese Patent Publication No. 59-21624, in which inwardly extending ratchet teeth are formed in both side walls of the frame, and a pair of lock means for these ratchet teeth in the both side walls are provided to prevent a webbing take-up shaft from rotating in the webbing pullout direction.

In the webbing take-up apparatus disclosed in Japanese Patent Publication No. 59-21624, inwardly extending ratchet teeth are formed in both side walls of the frame. Also, the take-up shaft is rotatably supported by pivot bearings provided in both sides of an outer cover for the frame, via bearings formed in the both side walls and extensions provided at both axial ends of the take-up shaft.

Cylindrical pins are provided on the axial end portions of the take-up shaft such that they are situated near a center axis and project from the axial end portions. Lock plates having outer teeth are rotatably supported by the cylindrical pins. A slide surface is formed on the end portion of each lock plate, and one end of a control lever contacts the slide surface to control the movement of the lock plate. When the control lever is operated, the lock plate is rotated while sliding relative to the control lever.

The control levers provided on both sides of the take-up shaft are connected to each other via a connecting rod provided inside the take-up shaft. The other end of one control lever, i.e., the end which does not contact the lock plate is provided with another slide surface.

On the extension provided at one axial end of the take-up shaft, an inertia plate having teeth at the outer circumferential surface thereof is supported for relative rotation with resect to the take-up shaft. From the inner end surface of the inertia plate, a connecting projection projects toward the interior of the frame for contact with the slide surface of the control lever. Also, an acceleration sensor is disposed below the inertial plate. When the acceleration sensor detects an abrupt deceleration of the vehicle, it stops the inertial plate.

During an abrupt deceleration of the vehicle, the webbing is pulled out by the inertia of the body of a vehicle occupant so that the take-up shaft is forced to rotate in the pull-out direction of the webbing. At this time, since the connecting projection provided on the inertia plate is stopped due to the stoppage of the inertia plate, a slide surface formed at the other end of the control lever contacts the connecting projection.

As a result, the control lever, while resisting the connecting projection, rotates in a predetermined direction about the connecting rod inside the take-up shaft and rotates another control lever via the connecting rod inside the take-up shaft.

Both the lock plates contacting the control levers through the respective slide surfaces move in a predetermined direction, so that they respectively mesh with inner ratchet teeth formed in both side walls of the frame, thereby stopping the rotation of the take-up shaft.

As described above, in the conventional webbing take-up apparatus having the above-described structure, the take-up shaft is stopped by the ratchet teeth formed in both side walls and the lock plates each engagable with the ratchet teeth. Accordingly, when the webbing is pulled out by the body of a vehicle occupant due to the inertia during an abrupt deceleration of the vehicle, the pulling force acting on the webbing is transmitted to both side walls of the frame. This eliminates the necessity of increasing the thickness of the frame, and reduces the weight of the webbing take-up apparatus. Also, since material having a very high strength is not needed, the webbing take-up apparatus can be manufactured at reduced costs.

However, in the above-described webbing take-up apparatus, the connecting projections and the control levers establish sliding contact therebetween to transmit movement from the former to the latter, and the control levers and the lock plates establish sliding contact therebetween to transmit movement from the former to the latter. Accordingly, there is a possibility that the lock timing of each lock plate becomes uncontrollable due to the dimensional errors and finish of those parts, and changes in the quality of the parts due to elapse of time, especially changes in the quality of the slide surfaces caused by wear.

In addition, since the lock mechanism for locking the take-up shaft which takes up the webbing is composed of many parts most of which are not directly connected to each other, each part involves an error in its movement. The error of movement of each part is transmitted to a downstream part so that the error is amplified. This increases the possibility that the lock timing of each lock plate becomes uncontrollable.

When the lock timing of each lock plate becomes uncontrollable, there occurs a problem that outer teeth of the pair of lock plates do not correctly mesh with the ratchet teeth formed in the side walls.

If the machining accuracy of each part is increased, the lock timing of each lock plate of the above-described webbing take-up apparatus can be securely controlled. However, this increases manufacturing costs.

SUMMARY OF THE INVENTION

The present invention has been accomplished by taking the above-mentioned facts into consideration, and the object of the present invention is to provide an improved webbing take-up apparatus in which a pair of lock plates can securely be operated at a predetermined timing, and which can be manufactured at reduced costs.

The present invention provides a webbing take-up apparatus which comprises a take up shaft rotatably supported by a frame which has a first and second ratchet openings. The webbing take-up apparatus also comprises a lock wheel, first and second lock plates, and a cam. The lock wheel rotates along with the take-up shaft in an ordinary state but is prevented from rotating in response to an abrupt deceleration of a vehicle so that a relative rotation is produced between the take-up shaft and the lock wheel. The first lock plate is held between one end of the take-up shaft and the lock wheel, and has first ratchet teeth. The first lock plate rotates with the take-up shaft and the lock wheel in an ordinary state, but moves radially outward, when a relative rotation is produced between the take-up shaft and the lock wheel in response to the abrupt deceleration of the vehicle, to engage the first ratchet teeth with the first ratchet opening. The cam is fixed to said lock wheel at one end thereof and penetrates the take-up shaft to extend to the other end of the take-up shaft in such a manner as to be movable relative to the take-up shaft. The cam is provided with a holding portion at the other end thereof. The second lock plate is held between the other end thereof the take-up shaft and the holding portion of the cam, and has second ratchet teeth. The second lock plate rotates with the take-up shaft and the lock wheel in an ordinary state, but moves radially outward, when a relative rotation is produced between the take-up shaft and the lock wheel in response to the abrupt deceleration of the vehicle, to engage the second ratchet teeth with the second ratchet opening.

In the webbing take-up apparatus according to the present invention, when the lock wheel rotates relative to the take-up shaft, the first lock plate which is held between one end of the take-up shaft and the lock wheel moves radially outward, so that the first ratchet teeth is engaged with the first ratchet opening formed in the frame to stop the take-up shaft.

When the lock wheel rotates relative to the take-up shaft, the cam, which is integral with the lock wheel, also rotates relative to the take-up shaft. As a result, the second lock plate held between the other end of the take-up shaft and the holding portion provided at the other end of the cam moves radially outward, so that the second ratchet teeth is engaged with the second ratchet opening formed in the frame to stop the take-up shaft.

As described, since the cam penetrating the take-up shaft is integral with the lock wheel, the lock wheel and the cam securely control the lock timings of the first lock plate and the second lock plate.

The above and other objects, features, and advantages of the present invention will become apparent from the following description and the appended claims, taken in conjunction with the accompanying drawings in which preferred embodiments of the present invention are shown by way of illustrative example.

BRIEF DESCRIPTION OF THE ACCOMPANYING DRAWINGS

The invention will now be described with reference to the accompanying drawings wherein.

DESCRIPTION OF THE PREFERRED EMBODIMENT

Figure 1:
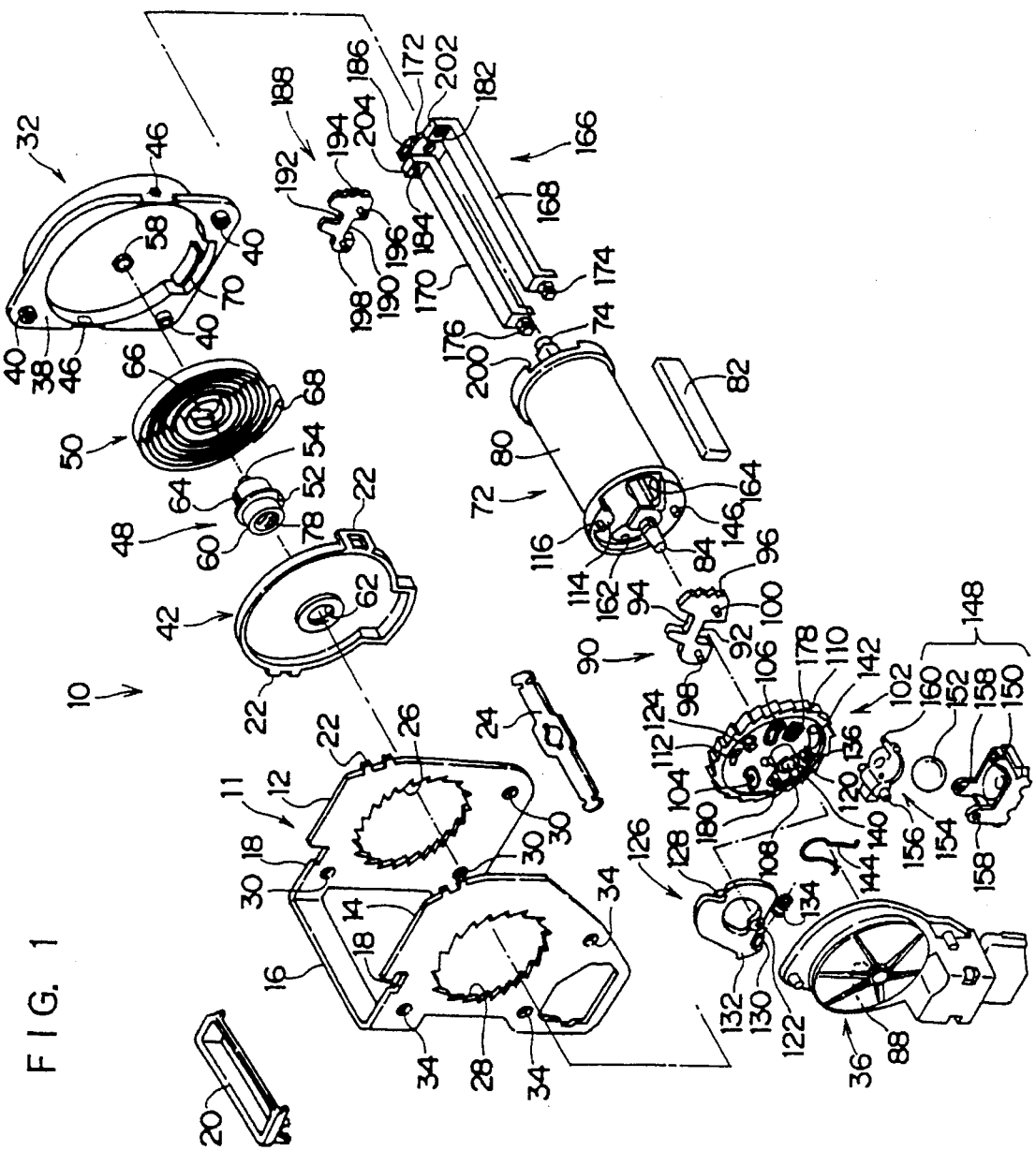
FIG. 1 is a perspective exploded view of a webbing take-up apparatus according to an embodiment of the present invention.

FIG. 1 shows a webbing take-up apparatus 10 according to an embodiment of the present invention.

The webbing take-up apparatus 10 has a frame 11 which is fixed to a body of a vehicle with unillustrated bolts.

The frame 11 is composed of side walls 12 and 14, and a support portion 16 provided between the side walls 12 and 14, which are integrally formed so that the side walls 12 and 14 are parallel to each other. A webbing stopper 20 is attached to cut-away portions 18 formed in the upper end portions of the side walls 12 and 14. When a webbing is completely wound up, an unillustrated buckle of the webbing engages the webbing stopper 20 so that the webbing is prevented from being taken up more than needed. A reinforcing plate 24 is fitted into cut-away portions 22 formed in the upper end portions of the side walls 12 and 14, thereby increasing the strength of the frame 11.

In the side wall 12, a ratchet opening 26 is formed which has inner ratchet teeth at a constant pitch.

In the side wall 14, a ratchet opening 28 is formed which has the same shape as that of the ratchet opening 26 such that the ratchet opening 28 faces the ratchet opening 26. Also, the side wall 12 is provided with a plurality of holes 30, and a cover 32 can be attached using the holes 30. Similarly, the side wall 14 is provided with a plurality of holes 34, and another cover 36 opposite to the cover 32 can be attached using the holes 34.

The cover 32 has a generally cylindrical box-like shape, and a generally rectangular flanges 38 are formed at portions which contact the side wall 12. The flanges 38 are provided with projections 40. The projections 40 are fitted into the holes 30 formed in the side wall 12 so that the cover 32 is fixed to the frame 11 for integration therewith. A generally circular sheet 42 is provided between the side wall 12 and the cover 32.

Connecting portions 22 are provided at diametrically opposite portions of the sheet 42, and the connecting portions 22 are mated with the protrusions 46 provided on the cover 32 to integrally fix the sheet 42 to the cover 32.

An adapter 48 and a spiral spring 50 are housed in the cover 32.

The adapter 48 is formed in a generally cylindrical shape. One axial end 54 of the adapter 48 is inserted into a hole 58 formed in the cover 32 while the other axial end 60 is inserted into the hole 62 formed in the sheet 42. Also, a flange 52 is formed at the radial end of the adapter 48. With this structure, the adapter 48 is rotatably supported within the cover 32 while being prevented from axially moving. A generally rectangular hole 64 is formed in one end of the adapter 48, and the radially inner end 66 of the spiral spring 50 is fixed to the hole 64. Also, the radially outer end 68 of the spiral spring 50 is fixed to a spring fixing projection 70 of the cover 32.

A take-up shaft 72 for taking up an unillustrated webbing has a generally cylindrical shape and is disposed between the side walls 12 and 14. A cylindrical projection 84 formed at one axial end of the take-up shaft 72 is inserted into an unillustrated hole formed in the cover 36 and a projection 74 formed at the other axial end of the take-up shaft 72 is inserted into a hole 78 formed in the end 60 of the adapter 48, thereby rotatably supporting the take-up shaft 72.

A webbing fixing groove 80 having a generally rectangular shape is formed in the radial side surface (outer peripheral surface) of the take-up shaft 72. One end of the unillustrated webbing is inserted into the webbing fixing groove 80, and a webbing fixing member 82 is also inserted into the webbing fixing groove 80, so that the webbing is fixed to the take-up shaft 72. The take-up shaft 72 has two through holes 162 and 164 which penetrate the take-up shaft 72 in the axial direction.

A lock plate 90 is arranged at one end of the take-up shaft 72. The lock plate 90 is provided with generally rectangular cut-away portions 92 and 94 which are formed at opposite sides of the lock plate 90. The cut-away portion 92 allows the lock plate 90 to stride over the projection 84 without contacting it. The cut-away portion 94 is engagable with a leading projection 114 formed at one axial end of the take-up shaft 72. When the take-up shaft 72 rotates, the leading projection 114 pushes the lock plate 90 so that the lock plate 90 rotates to follow the take-up shaft 72.

At the tip end of the lock plate 90, ratchet teeth 96 extending outward are formed and face the ratchet teeth of the side wall 14. When the lock plate 90 is led by the leading projection 114 of the take-up shaft 72 and moves accordingly, the ratchet teeth 96 mesh with the ratchet teeth of the ratchet opening 28. Also, a pair of pins 98 and 100 is formed on the side surface of the lock plate 90.

A lock wheel 102 is disposed on an outer side of the lock plate 90. The lock wheel 102 is formed in a dish-like shape, and ratchet teeth 110 are formed in the outer circumferential surface of the lock wheel 102. A hole 108 is formed in the central portion of the lock wheel 102, and the projection 84 of the take-up shaft 72 is inserted into the hole 108. With this structure, the lock wheel 102 is supported by the take-up shaft 72 while being allowed to relatively rotate with respect thereto.

A return spring 144 is disposed near the hole 108 of the lock wheel 102. One end of the return spring 144 is engaged with a pin 140 provided on the lock wheel 102, and the other end of the return spring 144 is engaged with a pin 146 which is formed at the axial end of the take-up shaft 72 and penetrates a hole 142 of the lock wheel 102. With this structure, the lock wheel 102 receives the spring force of the return spring 144 so that it is always urged in the webbing pull-out direction with respect to the take-up shaft 72. Accordingly, the lock wheel 102 can rotate integrally with the take-up shaft 72 or relatively rotate with respect thereto.

The lock wheel 102 is formed with guide holes 104 and 106 which receive the pins 98 and 100 of the lock plate 90 to movably hold the lock plate 90. When the lock wheel 102 rotates together with the take-up shaft 72 to follow it, the lock plate 90 is pushed by the leading projection 114 so that the lock plate 90 also rotates to follow the take-up shaft 72. At this time, the pins 98 and 100 of the lock plate 90 are located at one ends of the guide holes 104 and 106. Accordingly, in an ordinary state, the ratchet teeth 96 of the lock plate 90 are separated from the ratchet teeth of the ratchet opening 28.

Also, an elongated hole 112 is formed in the lock wheel 102, and a pin 116 formed on the leading projection 114 is inserted into the elongated hole 112. Therefore, the lock wheel 102 is allowed to rotate relative to the take-up shaft 72, but the range of the relative rotation is limited by the elongated hole 112.

A pin 120 and a key portion 124 are formed on the outer side surface of the lock wheel 102.

A pawl 126 is disposed on the outer side of the lock wheel 102. A hole 122 is formed in the lower end portion of the pawl 126, and the pin 120 of the lock wheel 102 is inserted into the hole 122, so that the pawl 126 is rotatably supported by the lock wheel 102. Also, a protrusion 128 is formed at the upper end portion of the pawl 126. The protrusion 128 is engaged with the key portion 124 of the lock wheel 102 to restrict the rotation of the pawl 126.

Moreover, a pin 130 is formed at the lower end portion of the pawl 126, and a coil spring 134 is fitted onto the pin 130. The tip end of the coil spring 134 is fixed to a projection 136 formed on the lock wheel 102. With this structure, the pawl 126 is always urged to move in the webbing pull-out direction with respect to the take-up shaft 72. Also, a claw portion 132 is provided in the vicinity of the pin 130 located at the lower end portion of the pawl 126.

Also, an acceleration sensor 148 is disposed just below the lock wheel 102. The acceleration sensor 148 is composed of a sensor housing 150, a sensor ball 152 and a sensor lever 154.

The sensor housing 150 has a box-like shape, and a downwardly curved concave is formed in the bottom portion thereof. The sensor ball 152 is placed on the curved concave.

A shaft 156 is formed at one end of the sensor lever 154 and is rotatably supported by a hole 158 formed in the sensor housing 150 at its one end. Also, an upwardly curved concave and a claw portion 160 are formed at the other end of the sensor lever 154. The curved concave of the sensor lever 154 is located above the sensor ball 152.

When the vehicle abruptly decelerates, the sensor ball 152 of the acceleration sensor 148 goes up along the curved concave of the sensor housing 150 and moves the sensor lever 154 upward so that the claw portion 160 of the sensor lever 154 engages with the ratchet teeth of the lock wheel 102.

Moreover, the above-described cover 36 is disposed on the outer side of the lock wheel 102 and is fixed to the side wall 14 of the frame 11. The cover 36 has an upper portion and a lower portion which are integrally formed. The upper portion has a cylindrical box-like shape while the lower portion has a rectangular box-like shape. The cover 36 covers various parts disposed at the side of the side wall 14.

Also, a cam 166 is disposed on the inner side of the lock wheel 102, i.e., the side facing the take-up shaft 72, and is attached to the lock wheel 102 for integration therewith.

The cam 166 has a pair of leg portions 168 and 170, and a holding portion 172 which connects the leg portions 168 and 170. Connecting portions 174 and 176 are respectively formed at first axial ends of the leg portions 168 and 170. Also, side walls 202 and 204 are extended upward from the second ends of the leg portions 168 and 170 to form bent portions. The side walls 202 and 204 are formed with guide holes 182 and 184. The above-mentioned holding portion 172 is connected to the lower end of the side wall 202 and the lower end of the side wall 204. With this structure, the leg portions 168 and 170 are integrally connected with each other. At the upper end of the holding portion 172, a holding claw 186 is provided which is bent toward the leg portions.

The leg portions 168 and 170 of the cam 166 respectively penetrate through holes 162 and 164 formed in the take-up shaft 72, and the connecting portions 174 and 176 of the leg portions 168 and 170 are inserted into connecting holes 178 and 180 formed in the lock wheel 102. With this, the cam 166 is integrally fixed to the lock wheel 102.

Since the through hole 162 and 164 are formed to have cross sections larger than those of the leg portions 168 and 170 of the cam 166, the cam 166 is allowed to rotate relative to the take-up shaft 72 within a predetermined angular range. In other words, the cam 166 always rotates together with the lock wheel 102, so that it rotates integral with the take-up shaft 72 or relatively rotates with respect thereto.

Also, a lock plate 188 is disposed between the side walls 202 and 204 of the cam 166 and the holding portion 172 and is movably held by the holding claw 186.

A pair of pins 196 and 198 are formed on a side surface of the lock pale 188. These pins 196 and 198 are inserted into guide holes 182 and 184 formed in the side walls 202 and 204 of the cam 166. As in the lock plate 90, the lock plate 188 is provided with generally rectangular cut-away portions 190 and 192 which are formed in opposite sides of the lock plate 188. The cut-away portion 190 allows the lock plate 188 to stride over the projection 74 without contacting it. The cut-away portion 192 is engagable with a leading projection 200 formed at the other axial end of the take-up shaft 72. When the take-up shaft 72 rotates, the leading projection 200 pushes the lock plate 188 so that the lock plate 188 rotates to follow the take-up shaft 72.

Also, like the lock plate 90, at the tip end of the lock plate 188, ratchet teeth 194 extending outward are formed and face the ratchet teeth 26 of the side wall 12. When the lock plate 188 is pushed by the leading projection 200 of the take-up shaft 72 and moves accordingly, the ratchet teeth 194 mesh with the ratchet teeth of the ratchet opening 26.

Figure 2:
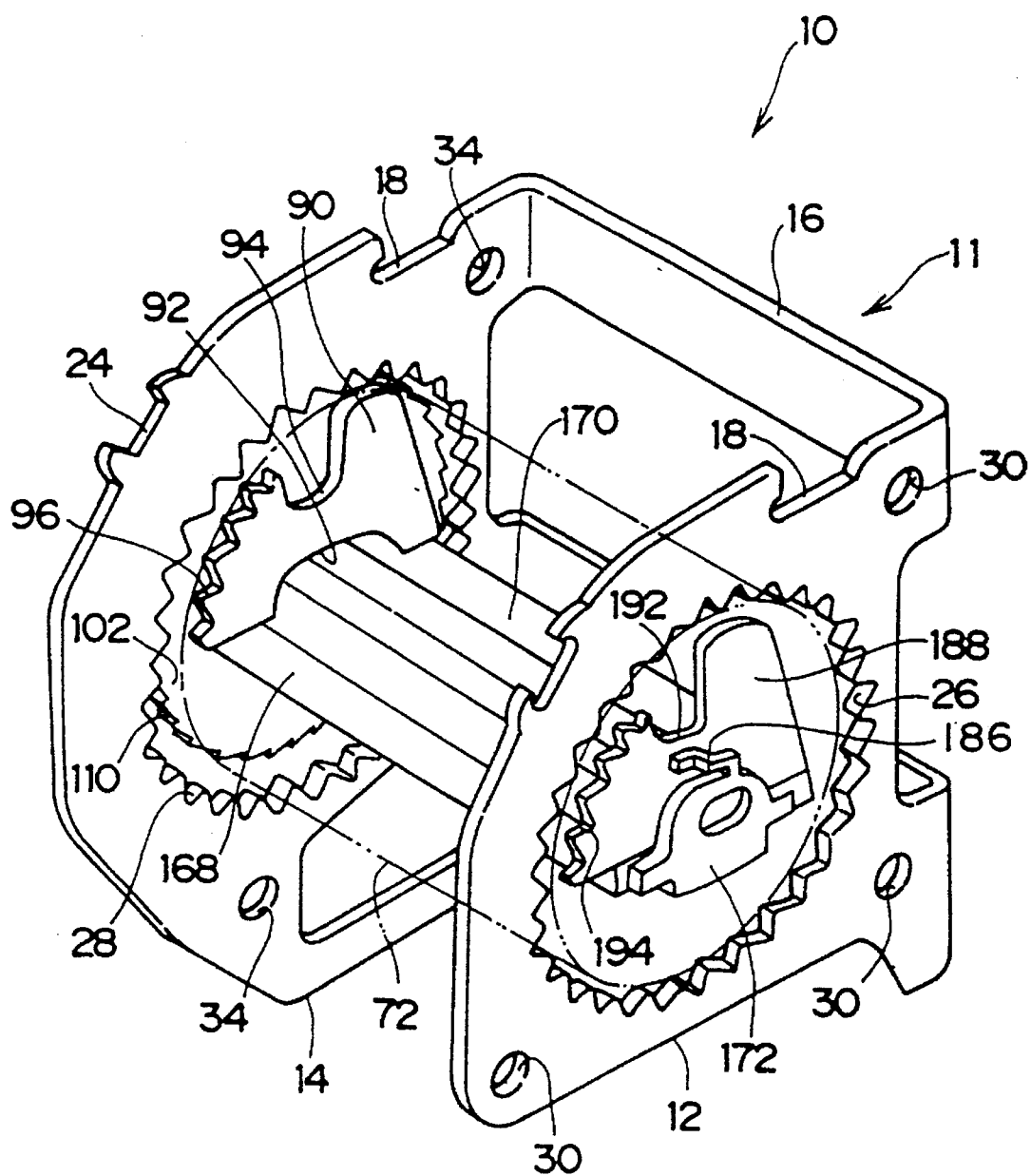
FIG. 2 is a perspective view showing the positional relationship among various parts, such as a lock wheel, a cam, and a pair of lock plates, of the webbing take-up apparatus shown in FIG. 1.

As shown in FIG. 2, the lock plate 90 and the lock plate 188 are disposed such that the corresponding portions thereof always oppose each other, and the lock plate 188 is moved in accordance with the movement of the cam 166 which is integrally connected to the lock wheel 102.

Next, the operation of the webbing take-up apparatus according to the present embodiment will be described.

Figure 3:
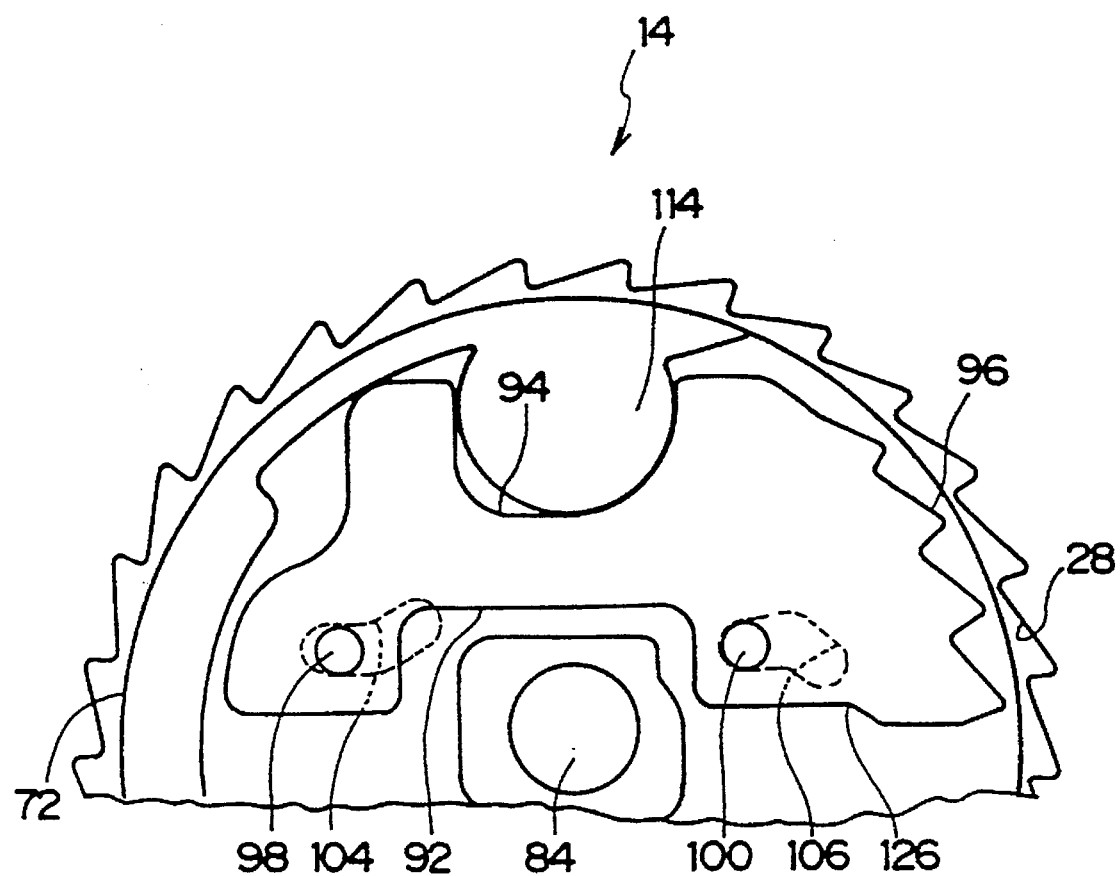
FIG. 3 is a front view of one lock plate of the webbing take-up apparatus which is located at an ordinary position.

In the webbing take-up apparatus 10 having the above-described structure, the lock wheel 102 rotates to follow the take-up shaft 72, as shown in FIG. 3, in an ordinary state, because the lock wheel 102 is urged by the return spring 144. At this time, the lock plate 90 is pushed by the leading projection 114 upon the rotation of the take-up shaft 72, so that the lock plates 90 rotates to follow the take-up shaft 72.

Figure 4:
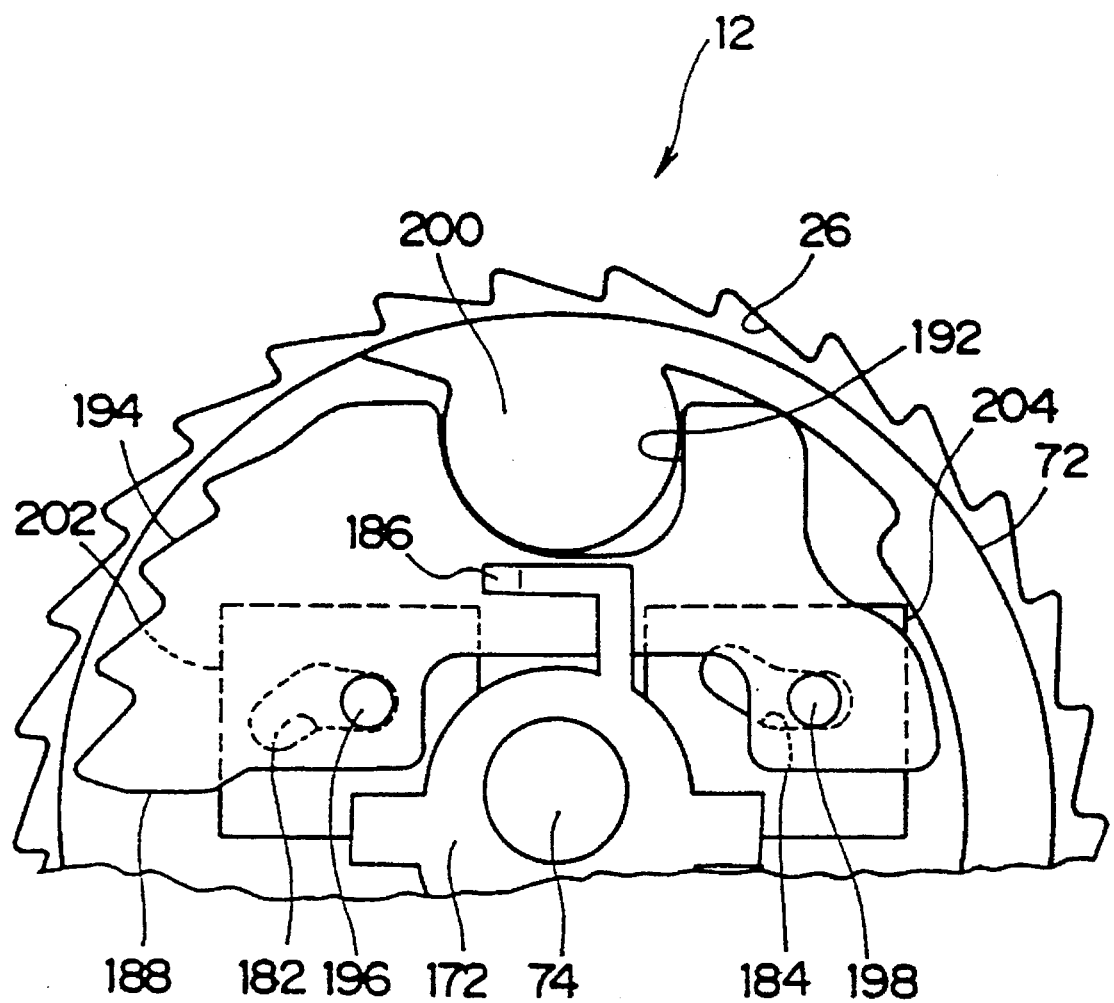
FIG. 4 is a front view of the other lock plate of the webbing take-up apparatus which is located at an ordinary position.

Also, when the lock wheel 102 follows the rotation of the take-up shaft 72, the cam 166 also rotates to follow the rotation. At this time, the lock plate 188 is pushed by the leading projection 200, as shown in FIG. 4, upon the rotation of the take-up shaft 72, so that the lock plate 188 rotates to follow the take-up shaft 72.

Accordingly, since the lock wheel 102, the cam 166, and the lock plates 90 and 188 rotate together with the take-up shaft 72 in an ordinary state, the pins 98 and 100 of the lock plate 90 are always located at first ends of the guide holes 104 and 106, and the pins 196 and 198 of the lock plate 188 are always located at first ends of the guide holes 182 and 184. Therefore, the ratchet teeth 96 of the lock plate 90 are separated from the ratchet teeth of the ratchet opening 28 of the side wall 14, and the ratchet teeth 194 of the lock plate 188 are separated from the ratchet teeth of the ratchet opening 26 of the side wall 12. In this state, the take-up shaft 72 can freely rotates in the webbing pull-out direction and the webbing take-up direction.

When the vehicle abruptly decelerates, this deceleration is detected by the acceleration sensor 148. That is, due to the inertia during the abrupt deceleration of the vehicle, the sensor ball 152 goes up along the curved concave of the sensor housing 150 and moves the sensor lever 154 upward. The sensor lever 154 moved upward by the sensor ball 152 rotates upward about the shaft 156 so that the claw portion 160 of the sensor lever 154 engages with the ratchet teeth 110 of the lock wheel 102. As a result, the lock wheel 102 is prevented from following the rotation of the take-up shaft 72.

Also, when the webbing is about to be abruptly pulled out due to an abrupt deceleration of the vehicle, the lock wheel 102 is caused to rotate together with the take-up shaft 72. However, at this time, the claw portion 132 of the pawl 126 disposed at the side of the lock wheel 102 engages with the ratchet teeth extending inward (not shown) which are formed in the cover 36, to prevent the rotation of the lock wheel 102.

Figure 5:
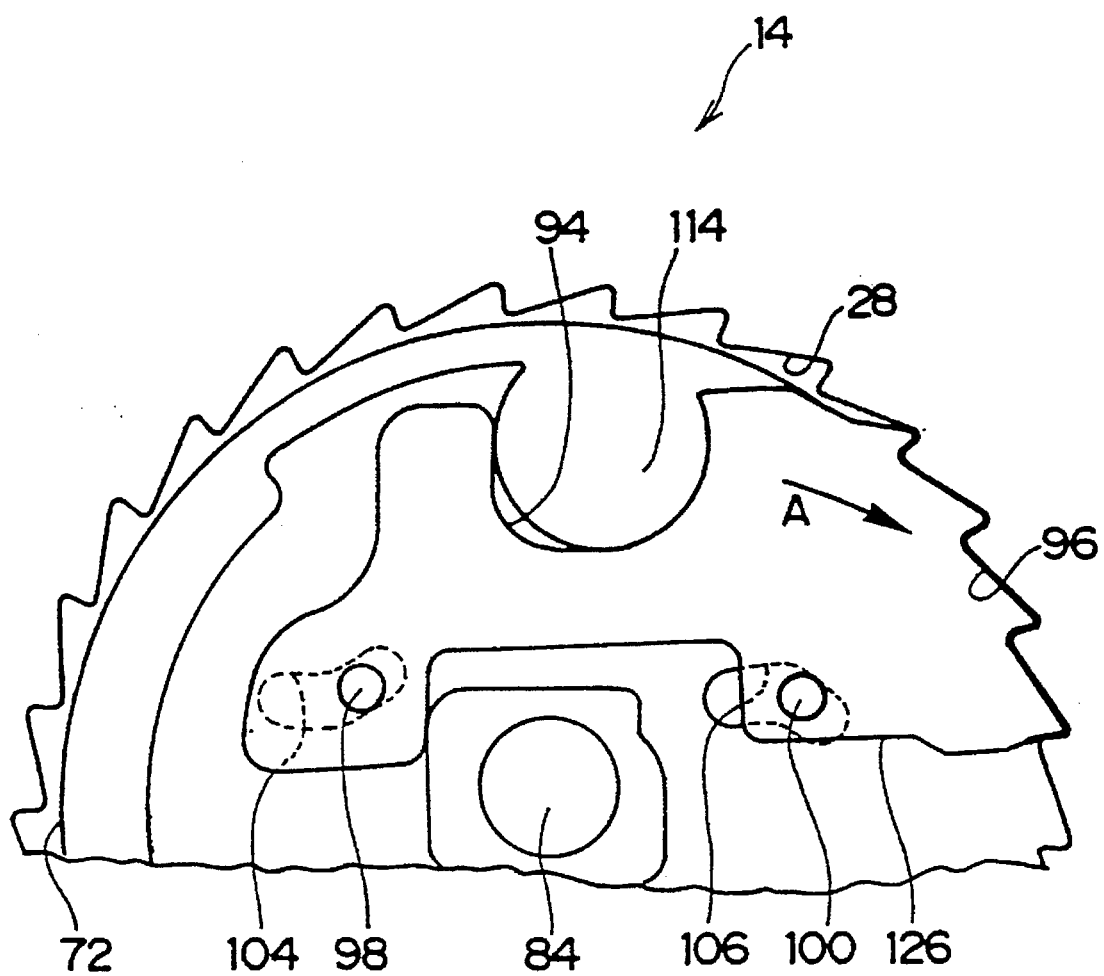
FIG. 5 is a front view of one lock plate of the webbing take-up apparatus which is located at a lock position.

As described above, the rotation of the lock wheel 102 is prevented by the acceleration sensor 148 or the pawl 126 when an abrupt deceleration starts, so that a relative rotation is produced between the lock wheel 102 and the take-up shaft 72. When such a relative rotation is produced between the lock wheel 102 and the take-up shaft 72, the lock plate 90, which is pushed by the leading projection 114 as shown in FIG. 5, becomes unable to follow the take-up shaft 72, and moves in the direction indicated by arrow A in FIG. 5, while the pins 98 and 100 are guided by the guide holes 104 and 106 of the lock wheel 102. With this operation, the ratchet teeth 96 of the lock plate 90 mesh with the ratchet teeth of the ratchet opening 28 of the side wall 14 to prevent the rotation of the take-up shaft 72.

Figure 6:
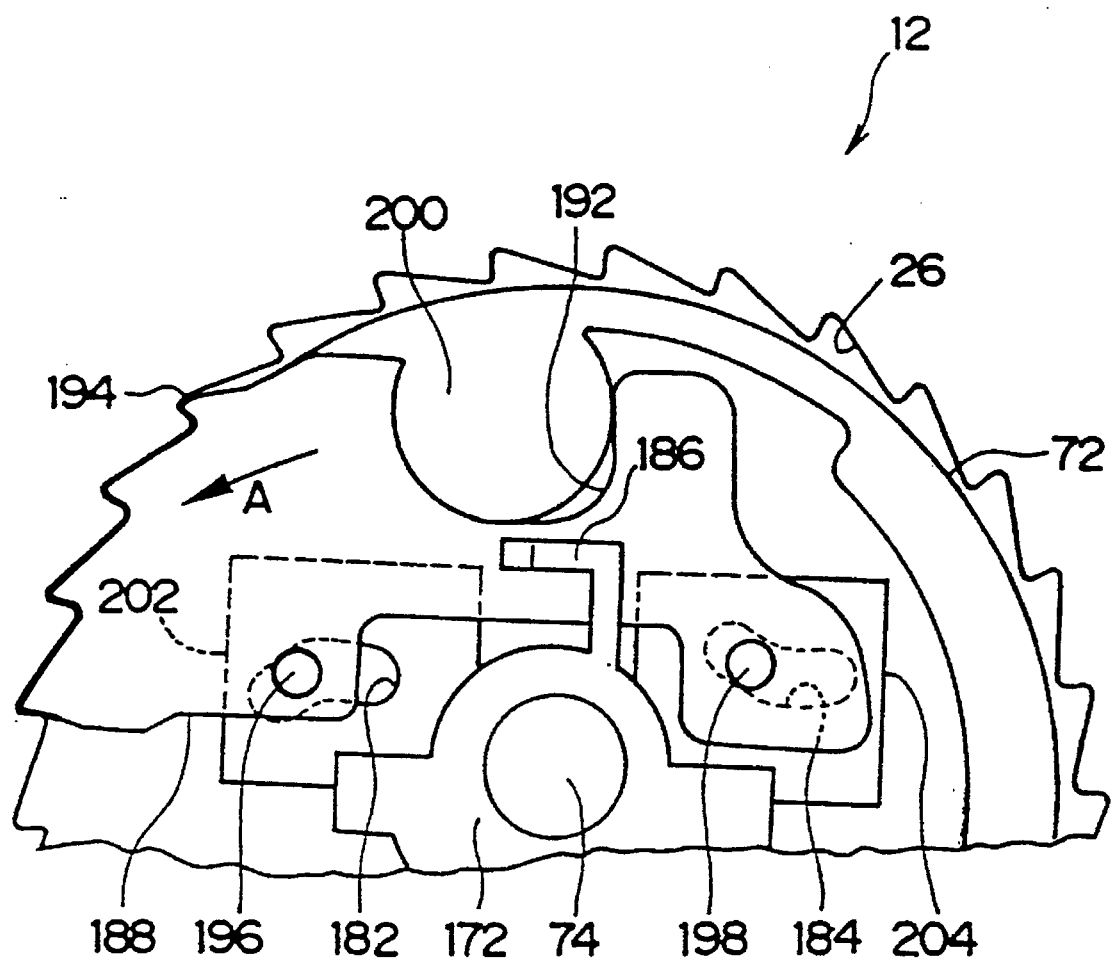
FIG. 6 is a front view of the other lock plate of the webbing take-up apparatus which is located at a lock position.

Since the lock wheel 102 and the cam 166 are integrally connected with each other, the stoppage of the lock wheel 102 causes a relative rotation of the cam 166 with respect to the take-up shaft 72. When such a relative rotation is produced between the cam 166 and the take-up shaft 72, the lock plate 188, which is pushed by the leading projection 200 of the take-up shaft 72 as shown in FIG. 6, becomes unable to follow the take-up shaft 72, and moves in the direction indicated by arrow A in FIG. 6, while the pins 196 and 198 are guided by the guide holes 182 and 184 of the cam 166. With this operation, the ratchet teeth 194 of the lock plate 188 mesh with the ratchet teeth of the ratchet opening 26 of the side wall 12 to prevent the rotation of the take-up shaft 72.

Since the lock wheel 102 and the cam 166 are integrally connected with each other, the lock plate 90 and the lock plate 188 are operated at a predetermined timing to mesh with the teeth of the ratchet openings 28 and 26 of the side walls 14 and 12, thereby preventing the rotation of the take-up shaft 72 in the webbing pull-out direction. With this operation, the webbing is prevented from being pulled out to securely hold the vehicle occupant.

As described above, the lock wheel 102 and the cam 166 are integrally connected with each other in the present embodiment. Accordingly, the lock plate 90 and the lock plate 188 can be surely operated at a predetermined timing so that the lock plate 90 mesh with the teeth of the ratchet opening 28 of the side wall 14, and the lock plate 188 mesh with the teeth of the ratchet opening 26 of the side wall 12. Also, the lock plates 90 and 188 are moved while being directly guided by the lock wheel 102 and the cam 166, respectively. Accordingly, the number of parts can be reduced, and it becomes unnecessary to increase the machining accuracy of each part. Therefore, the webbing take-up apparatus of the present embodiment can be manufactured at reduced costs.

In the present embodiment, the lock wheel 102 and the cam 166 are connected with each other via the connecting portions 174 and 176 and the connecting holes 178 and 180. However, other methods may be used to connect the lock wheel 102 and the cam 166 in so far as these parts are provided in an integrated state. For example, the lock wheel may be formed integrally with the cam. In this case, the take-up shaft may divided along its center axis to facilitate the assembly work.

As described above, in the webbing take-up apparatus according to the present invention, the rotation of the take-up shaft is stopped by the ratchet openings formed in both side walls of the frame and the lock plates respectively provided for the ratchet openings. Accordingly, it becomes unnecessary to increase the thickness of the frame, and therefore the weight of the webbing take-up apparatus can be reduced. In addition, since a notably strong material is not specifically needed, the webbing take-up apparatus can be manufactured at reduced costs. Moreover, since the lock wheel and the cam are provided in an integrated state or as a single member, the pair of lock plates can be controlled such that these lock plates surely engage with the ratchet teeth, which are formed in both side walls of the frame, at a predetermined timing, without increasing the machining accuracy of the parts. Also, since it becomes unnecessary to increase the machining accuracy of each part and the number of parts can be reduced, the webbing take-up apparatus according to the present invention can be manufactured at further reduced costs.

While the embodiment of the present invention, as herein disclosed, constitutes a preferred form, it is to be understood that other forms might be adopted.

What is claimed is:

1. A webbing take-up apparatus comprising:

a take up shaft rotatably supported by a frame having a first and second ratchet openings to stratiformly take up a webbing for restraining a vehicle occupant;

a lock wheel which rotates along with said take-up shaft in an ordinary state but is prevented from rotating in response to an abrupt deceleration of a vehicle so that a relative rotation is produced between said take-up shaft and said lock wheel;

a first lock plate which is held between one end of said take-up shaft and said lock wheel and which has first ratchet teeth, said first lock plate rotating with said take-up shaft and said lock wheel in an ordinary state, but moving radially outward, when a relative rotation is produced between said take-up shaft and said lock wheel in response to the abrupt deceleration of the vehicle, to engage said first ratchet teeth with said first ratchet opening;

a cam which is fixed to said lock wheel at one end thereof and penetrates said take-up shaft to extend to the other end of said take-up shaft in such a manner as to be movable relative to said take-up shaft, said cam being provided with a holding portion at the other end of thereof; and a second lock plate which is held between the other end of said take-up shaft and said holding portion of said cam and which has second ratchet teeth, said second lock plate rotating with said take-up shaft and said lock wheel in an ordinary state, but moving radially outward, when a relative rotation is produced between said take-up shaft and said lock wheel in response to the abrupt deceleration of the vehicle, to engage said second ratchet teeth with said second ratchet opening.

2. A webbing take-up apparatus according to claim 1, wherein said frame comprises first and second side walls which are parallel with each other, and a support portion provided between said first and second side walls.

3. A webbing take-up apparatus according to claim 2, wherein said first and second ratchet openings are respectively formed in said first and second side walls.

4. A webbing take-up apparatus according to claim 2, wherein said take-up shaft is disposed between said first and second side walls.

5. A webbing take-up apparatus according to claim 1, wherein ratchet teeth are formed in the outer circumferential surface of said lock wheel, and when the vehicle abruptly decelerates, a claw portion of an acceleration sensor engages with the ratchet teeth of said lock wheel to prevent the rotation of said lock wheel.

6. A webbing take-up apparatus according to claim 1, wherein a pawl is disposed at a side of said lock wheel, and when a webbing is abruptly pulled out due to an abrupt deceleration of the vehicle, a claw portion of said pawl engages with inwardly extending ratchet teeth formed on a cover, to prevent the rotation of said lock wheel.

7. A webbing take-up apparatus according to claim 1, wherein said lock wheel is always urged by a return spring disposed between said lock wheel and said take-up shaft, in a direction in which the webbing is pulled out, and in an ordinary state, said lock wheel rotates to follow said take-up shaft in the urged state.

8. A webbing take-up apparatus according to claim 1, wherein said first lock plate is provided with a first pin and a first cut-away portion; said lock wheel is provided with a first guide hole corresponding to said first pin; said take-up shaft is provided at one end thereof with a first leading projection corresponding to said first cut-away portion; and said first lock plate is held between the one end of said take-up shaft and said lock wheel by inserting said first pin into said first guide hole and engaging said leading projection with said first cut-away portion, whereby when a relative rotation is produced between said take-up shaft and said lock wheel, said first leading projection moves said first lock plate radially outward to engage said first ratchet teeth with said first ratchet opening.

9. A webbing take-up apparatus according to claim 1, wherein said second lock plate is provided with a second pin and a second cut-away portion; said cam is provided with a second guide hole corresponding to said second pin; said take-up shaft is provided at the other end thereof with a second leading projection corresponding to said second cut-away portion; and said second lock plate is held between the other end of said take-up shaft and said holding portion of said cam by inserting said second pin into said second guide hole and engaging said leading projection with said second cut-away portion, whereby when a relative rotation is produced between said take-up shaft and said lock wheel, said second leading projection moves said second lock plate radially outward to engage said second ratchet teeth with said second ratchet opening.

10. A webbing take-up apparatus comprising:
- a take up shaft rotatably supported between a first and second side walls of a frame to stratiformly take up a webbing for restraining a vehicle occupant, said first and second side walls included in said frame to be parallel with each other and having a first and second ratchet openings;
- a lock wheel which rotates along with said take-up shaft in an ordinary state, while being urged in a direction in which the webbing is pulled out, but is prevented from rotating in response to an abrupt deceleration of a vehicle so that a relative rotation is produced between said take-up shaft and said lock wheel;
- a first lock plate which is held between one end of said take-up shaft and said lock wheel and which has first ratchet teeth, said first lock plate rotating with said take-up shaft and said lock wheel in an ordinary state, but moving radially outward, when a relative rotation is produced between said take-up shaft and said lock wheel in response to the abrupt deceleration of the vehicle, to engage said first ratchet teeth with said first ratchet opening;
- a cam which is fixed to said lock wheel at one end thereof and penetrates said take-up shaft to extend to the other end of said take-up shaft in such a manner as to be movable relative to said take-up shaft, said cam being provided with a holding portion at the other end thereof; and
- a second lock plate which is held between the other end of said take-up shaft and said holding portion of said cam and which has second ratchet teeth, said second lock plate rotating with said take-up shaft and said lock wheel in an ordinary state, but moving radially outward, when a relative rotation is produced between said take-up shaft and said lock wheel in response to the abrupt deceleration of the vehicle, to engage said second ratchet teeth with said second ratchet opening.

11. A webbing take-up apparatus according to claim 10, wherein ratchet teeth are formed in the outer circumferential surface of said lock wheel, and when the vehicle abruptly decelerates, a claw portion of an acceleration sensor engages with the ratchet teeth of said lock wheel to prevent the rotation of said lock wheel.

12. A webbing take-up apparatus according to claim 10, wherein a pawl is disposed at a side of said lock wheel, and when a webbing is abruptly pulled out due to an abrupt deceleration of the vehicle, a claw portion of said pawl engages with inwardly extending ratchet teeth formed on a cover, to prevent the rotation of said lock wheel.

13. A webbing take-up apparatus according to claim 10, wherein said lock wheel is always urged by a return spring disposed between said lock wheel and said take-up shaft, in a direction in which the webbing is pulled out.

14. A webbing take-up apparatus according to claim 10, wherein said first lock plate is provided with a first pin and a first cut-away portion; said lock wheel is provided with a first guide hole corresponding to said first pin; said take-up shaft is provided at one end thereof with a first leading projection corresponding to said first cut-away portion; and said first lock plate is held between the one end of said take-up shaft and said lock wheel by inserting said first pin into said first guide hole and engaging said leading projection with said first cut-away portion, whereby when a relative rotation is produced between said take-up shaft and said lock wheel, said first leading projection moves said first lock plate radially outward to engage said first ratchet teeth with said first ratchet opening.

15. A webbing take-up apparatus according to claim 14, wherein said second lock plate is provided with a second pin and a second cut-away portion; said cam is provided with a second guide hole corresponding to said second pin; said take-up shaft is provided at the other end thereof with a second leading projection corresponding to said second cut-away portion; and said second lock plate is held between the other end of said take-up shaft and said holding portion of said cam by inserting said second pin into said second guide hole and engaging said leading projection with said second cut-away portion, whereby when a relative rotation is produced between said take-up shaft and said lock wheel, said second leading projection moves said second lock plate radially outward to engage said second ratchet teeth with said second ratchet opening.

16. A webbing take-up apparatus according to claim 10, wherein said second lock plate is provided with a second pin and a second cut-away portion; said cam is provided with a second guide hole corresponding to said second pin; said take-up shaft is provided at the other end thereof with a second leading projection corresponding to said second cut-away portion; and said second lock plate is held between the other end of said take-up shaft and said holding portion of said cam by inserting said second pin into said second guide hole and engaging said leading projection with said second cut-away portion, whereby when a relative rotation is produced between said take-up shaft and said lock wheel, said second leading projection moves said second lock plate radially outward to engage said second ratchet teeth with said second ratchet opening.

17. A webbing take-up apparatus comprising:
- a take up shaft rotatably supported between a first and second side walls of a frame to stratiformly take up a webbing for restraining a vehicle occupant, said first and second side walls included in said frame to be parallel with each other and having a first and second ratchet openings, said take-up shaft having first and second leading projections formed at one and the other ends thereof;
- a lock wheel which rotates along with said take-up shaft in an ordinary state, while being urged in a direction in which the webbing is pulled out, but is prevented from rotating in response to an abrupt deceleration of a vehicle so that a relative rotation is produced between said take-up shaft and said lock wheel, said lock wheel being formed with a first guide hole;
- a first lock plate which is formed with a first cut-away portion corresponding to said first leading projection, a first pin corresponding to said first guide hole, and first ratchet teeth, and which is held between one end of said take-up shaft and said lock wheel by inserting said first pin into said first guide hole and engaging said first leading projection with said first cut-away portion, said first lock plate rotating with said take-up shaft and said lock wheel in an ordinary state, but being moved radially outward by said first leading projection, when a relative rotation is produced between said take-up shaft and said lock wheel in response to the abrupt deceleration of the vehicle, to engage said first ratchet teeth with said first ratchet opening;
- a cam which is fixed to said lock wheel at one end thereof and penetrates said take-up shaft to extend to the other end of said take-up shaft in such a manner as to be movable relative to said take-up shaft, said cam being provided with a holding portion at the other end thereof, and being formed with a second guide hole; and a second lock plate which is formed with a second cutaway portion corresponding to said second leading projection, a second pin corresponding to said second guide hole, and second ratchet teeth, and which is held between the other end of said take-up shaft and said holding portion of said cam by inserting said second pin into said second guide hole and engaging said second leading projection with said second cut-away portion, said second lock plate rotating with said take-up shaft and said lock wheel in an ordinary state, but being moved radially outward by said second leading projection, when a relative rotation is produced between said take-up shaft and said lock wheel in response to the abrupt deceleration of the vehicle, to engage said second ratchet teeth with said second ratchet opening.

18. A webbing take-up apparatus according to claim 17, wherein ratchet teeth are formed in the outer circumferential surface of said lock wheel, and when the vehicle abruptly decelerates, a claw portion of an acceleration sensor engages with the ratchet teeth of said lock wheel to prevent the rotation of said lock wheel.

19. A webbing take-up apparatus according to claim 17, wherein a pawl is disposed at a side of said lock wheel, and when a webbing is abruptly pulled out due to an abrupt deceleration of the vehicle, a claw portion of said pawl engages with inwardly extending ratchet teeth formed on a cover, to prevent the rotation of said lock wheel.

20. A webbing take-up apparatus according to claim 17, wherein said lock wheel is always urged by a return spring disposed between said lock wheel and said take-up shaft, in a direction in which the webbing is pulled out.

* * * * *